Oct. 31, 1967 R. C. LEE ET AL 3,350,509

TIME DIVISION TONE SIGNALING SYSTEM

Filed Dec. 10, 1964 4 Sheets-Sheet 1

INVENTORS R. C. LEE
R. O. SOFFEL
F. S. VIGLIANTE

BY Howard L. Popper
ATTORNEY

Oct. 31, 1967 R. C. LEE ET AL 3,350,509

TIME DIVISION TONE SIGNALING SYSTEM

Filed Dec. 10, 1964 4 Sheets-Sheet 3

3,350,509
Patented Oct. 31, 1967

3,350,509

TIME DIVISION TONE SIGNALING SYSTEM

Robert C. Lee and Robert O. Soffel, Middletown, and Frank S. Vigliante, Piscataway Township, Middlesex County, N.J., assignors to Bell Telephone Laboratories, Incorporated, New York, N.Y., a corporation of New York Filed Dec. 10, 1964, Ser. No. 417,390
10 Claims. (Cl. 179—18)

This invention relates to time division telephone switching systems and more particularly to the transmission of called-number digit signals therein.

The copending application of Gebhardt et al. Serial No. 195,199, filed May 16, 1962, now Patent No. 3,225,-144 and Seley et al., Serial No. 252,797, filed Jan. 21, 1963, now Patent Number 3,268,669, disclose electronic time division switching systems providing private branch exchange (PBX) service. In these systems, a stored program common control, called a control unit, located in the central office building, controls a number of remote switching units, each such switch unit having capacity to service approximately two hundred extension lines having dial pulse or tone signalling telephone sets, forty central office trunks, and a comparable number of tie trunks, miscellaneous trunks, and several attendant positions. Time division switching is employed in these switch units and in the input-output section of the control unit. The concept of shared common control provides high traffic on the control unit even though each switch unit may have only a relatively small number of lines. The resulting concentration of a large number of actions at a common point allows the system to make economical use of high speed electronic devices.

While the above-mentional systems permitted rotary dial or tone-signalling telephone sets to be connected at the switch unit, for calls outgoing over a central office trunk the transmission of signals between the control unit and the central office trunk was by means of dial pulsing at the conventional rate of ten pulses per second. On normal outgoing calls, this pulsing rate did not produce any noticeable delay in the completion of the call because even though the system had to wait until the complete office code was transmitted before it started outpulsing, it could then commence outpulsing on an overlap basis while the remaining digits were still being received. This delay was necessary so that toll diversion, if required, could be accomplished. Accordingly, outpulsing was not far behind the customer's completion of dialing.

The situation is quite different, however, when the customer is accorded compressed dialing service in which three digits, for example, may be dialed (or keyed) for an outgoing call. After all three digits have been received, the above system translates the compressed code into the seven or ten digit number it represents, seizes a central office trunk and after receiving the signals that the originating register has been attached, stars sending the number. Thus, the customer would have to wait on the average of somewhat more the five seconds after he had finished dialing before the central office started to set up the call. This period during which the customer would be waiting and would hear no indication that anything was happening has proved to be somewhat annoying and wasteful of switching system time.

Accordingly, it is an object of the present invention to reduce waiting time on calls by improving the speed of transmission of called-number digits between a calling telephone and the central office.

It is another object of the present invention to improve the transmission of the expanded counter parts of condensed called-number codes in time division switching systems.

Before proceeding with the detailed exposition of the present invention, it is advantageous briefly to summarize some of the operating principles of the system in whose context the invention will be described.

Information transmitted to the control unit from the switch unit, in the form of dialed or keyed digits, or supervisory data, is stored in the input equipment of the control unit until requested by the call processing equipment of the control unit. The call processing equipment sets up and supervises calls at the various switch units, records the present state of all calls and up-dates these states according to subscribers' actions. The call records are maintained in a temporary memory. Up-dating is done through a stored program of instructions that correlates new inputs to the system with past records and initiates the desired outputs. The output information includes data messages for transmission to switch units and digits to be outdialed, either over a central office, or foreign exchange trunk to a central office, or over a tie trunk to another PBX.

In the above-mentioned systems, control information is transmitted between the switch unit and the control unit over data links. Called-number information, on the other hand, is transmitted over digit trunks which provide separate signaling paths over voice frequency pairs from the switch unit to the control unit. The called-number information may be in the form of either dial pulses or multifrequency tones. When dial pulses are sent, a digit trunk circuit at the remote switch unit converts them to bursts of multifrequency tone for transmission to the digit receiver at the control unit, as disclosed, for example, in Gebhardt et al. application Serial No. 312,-463, filed Sept. 30, 1963, now Patent Number 3,315,039. The bursts of tone corresponding to rotary dial pulses are recognized by a tuned digit receiver as special tones that must be counted to determine the digit dialed. However, if the remote station is equipped to originate multifrequency tone signals, these signals are passed directly through the digit trunk and are recognized by the digit receiver at the control unit and interpreted there as digits dials from a multifrequency signaling telephone set. Thus, the same digit trunk circuits permit dialing from either multifrequency or rotary dial telephone sets. Both types of telephone sets, in fact, may be bridged on the same station line.

In the operation of the above-described systems, the calling privileges accorded any line are stored in a line information store which is similar to the program store but of somewhat smaller capacity. Among the calling privilege information stored in the line information store may be groups of compressed dialing translations by means of which a station may be accorded abbreviated dialing privileges. When digits of a compressed code call are entered in one of the digit receivers they are transferred to the call processor and the line information store is consulted. An idle central office trunk is seized via the trunk connector, and upon receipt of the register attached signal from the central office, the expanded code counterpart of the compressed code is outpulsed by operating the trunk connector to send seize and release signals to the central office trunk.

In the above-described systems, dial pulses are transmitted to the central office through the trunk circuit. Specifically, the dialed digits are received from a remote switch unit over a digit trunk and then utilized to control, via a sender control circuit, a trunk connector circuit which applies seize and release signals to the trunk. When compressed dialing is added to such systems, the expanded code, rather than the compressed dialing code received from the switch unit, is applied to control the seize and release signals. The operation of the trunk connector in sending these seize and release signals to the central office simulates the dial pulsing, and the digits of the expanded code consequently are transmitted to the central office at the conventional dial pulsing rate of 10 pulses per second. A seven digit number may accordingly require as much as 7 seconds for outpulsing alone.

Although it is known that a sequence of digits may be transmitted in telephone systems by multifrequency tone sources in much less time, such sources cannot be incorporated in the sender control circuits of the systems alluded to above because there is no path between the sender control and the trunk circuit other than the seize and release signal path of the trunk connector circuit, and this path is incapable of transmitting tone signaling information.

In addition to the long delays involved in compressed dialing utilizing normal dial pulsing techniques in the above systems, there is the further requirement of considerable duplication of equipment to enable a number of compressed dialing calls to be handled simultaneously.

In accordance with the principles of the present invention, in one illustrative embodiment thereof a plurality of multifrequency tone sources, each source representing a decimal called-number digit, are connected to a time division bus in the control unit of the electronic time division telephone switching system. The time division bus is advantageously under the control of the same connector circuit as is responsible for establishment of connections between the digit trunks incoming from remote switch units and the digit receivers of the control unit which normally receive multifrequency signals over the digit trunks and which also return dial tone thereover. When the digits of a compressed code call are registered in one of the aforementioned digit receivers and thereafter recognized by the call processor as, in fact, being the digits of a compressed code, an idle central office trunk from the remote switch unit to the central office is selected and a connection is established at the remote switch unit between the digit trunk and the selected idle central office trunk. The line information store is consulted and the expanded code counterpart of the compressed code is ascertained. Thereafter, the time division bus is controlled to selectively connect the aforementioned multifrequency tone sources, provided in the control unit, to the digit trunk in the order representative of the expanded code. The multifrequency tones so sequentially applied to the digit trunk are continued over the connection established at the switch unit between the digit trunk and the selected outgoing trunk to the central office. The central office responds to these tones in the usual manner and establishes the outgoing connection.

It is to be pointed out that in systems incorporating embodiments of our invention the compressed dialing operation may be accomplished very rapidly and that further, because of the time division operation of the compressed dialing circuitry, a number of different compressed dialing codes can be transmitted during the same time interval. Thus only one set of ten tone sources need be employed to handle all calls, and, although a particular digit can be transmitted for only one call at a time, a number of calls can be handled simultaneously.

To illustrate the increased speed of operation available in systems in accordance with our invention, a digit is transmitted by the tone sources in a selected time slot during one scan of the temporary or call store, of the control, is removed during the next scan, and the succeeding digit is transmitted by the tone sources during the suceeding scan. In one specific illustrative embodiment of our invention this meant that a digit is transmitted, through the time division gates, for 64 milliseconds with 64 milliseconds between digits. If a particular tone source is not available when needed, the call processor will wait and check it in the next scan. Accordingly, during periods of heavy compressed dialing traffic, it is possible for an interdigital interval to be somewhat longer. However, we have found that normally the seven digits of a compressed dialing code can be transmitted by the tone sources on a time division basis in a little over 800 milliseconds.

Accordingly, it is a feature of the present invention to transmit multifrequency tone counterparts of condensed dialing codes over a time division bus and digit trunk to the remote switch unit and to extend the tones so transmitted over a connection established at the switch unit from the digit trunk to a selected central office trunk.

It is another feature of the present invention to employ the same time division bus as is normally used to establish connections between incoming digit trunks from the switch unit and the digit receivers of the control unit.

It is another feature of the present invention selectively to connect multifrequency digit tone sources to a control unit time division bus (normally serving to connect control unit digit receivers with a digit trunk from a remote switch unit) to transmit multifrequency digit tones back over the digit trunk to the remote switch unit.

It is still another feature of the present invention to establish over a time division bus at the remote switch unit a further connection between the digit trunk and an outgoing central office trunk over which connection the multifrequency digit tone sources transmit digit information to the central office.

The foregoing and other objects and features may become more apparent from a consideration of the following detailed description and accompanying drawing in which.

Figure 1:
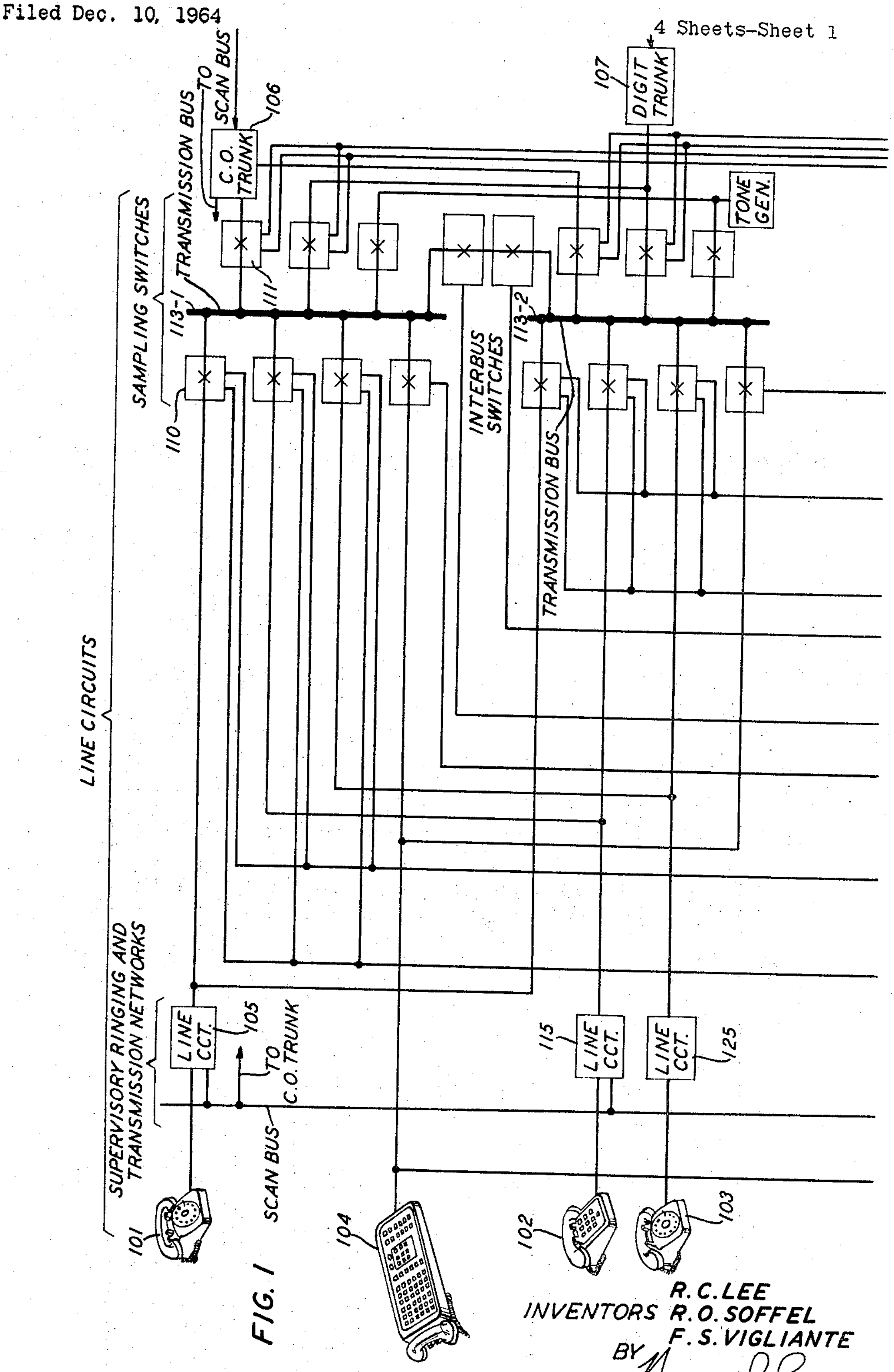
FIGS. 1 and 2 show the remote switch unit and associated stations of one specific illustrative embodiment of our invention.
Figure 2:
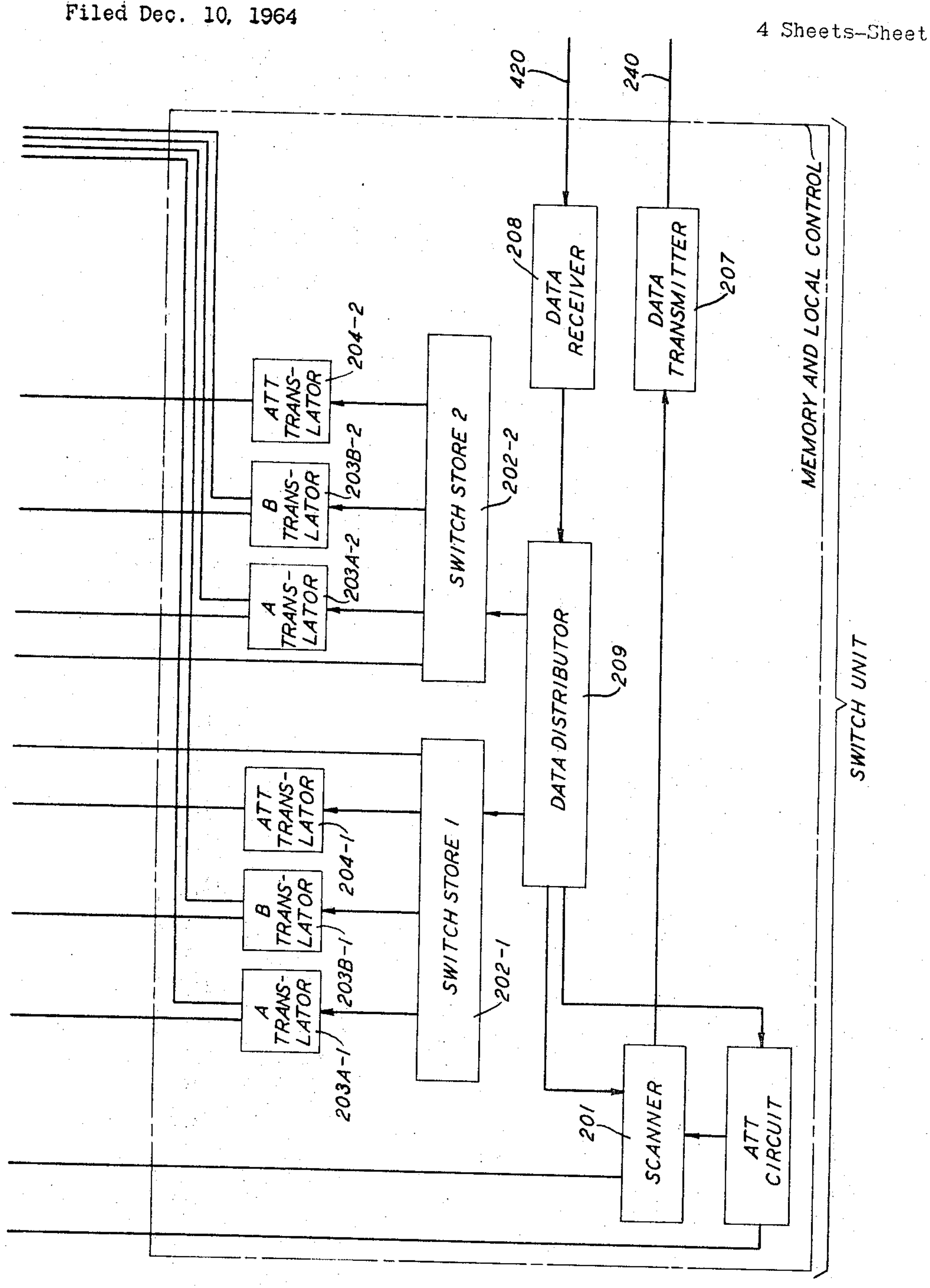
Figure 5:
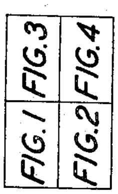
FIG. 5 shows how FIGS. 1–4 should be arranged.

Referring now to the combined figures of the drawing, there is shown a portion of the electronic time division private branch exchange telephone switching system of the type generally referred to above. The system illustrated includes a remote switch unit (FIGS. 1, 2) serving a plurality of telephone sets 101–103, an attendant console 104, and a central office trunk 106. The remote switch unit employs a time division switching network in which connections between two line or trunk circuits are established by periodically closing their corresponding sampling switches 110, 111 at the common buses 113–1, 2. Two such common buses are shown in FIG. 1, each line circuit 105, 115, 125 having an appearance in each bus. In general, the elements of the switch unit and control unit are duplicated for reliability. The line circuit 105 provides transmission, supervisory, and ringing functions for the associated telephone. In performing the supervisory function, the line circuit informs the scanner 201 (FIG. 2) of the off-hook or on-hook condition of the associated telephone set.

Network control at the switch unit comprises the duplicated switch store 202–1, 2 which records the calls in progress and duplicated translators 203A–1, 2; 203B–1, 2; 204–1, 2 for activating the appropriate time division sampling switches 110, 111. The switch store has memory locations for each of the time slots, i.e., the time interval allotted to each pair of sampling switches. During each time slot the connection information is read out of the corresponding "word" in switch store 202–1 or 202–2 and transferred to the respective one of translators 203A–1, 2; 203B–1, 2 and 204–1, 2. The output of the aforementioned translators selectively activates the appropriate pair of sampling switches to connect the line or trunk to the common bus 113–1, 2.

Figure 4:
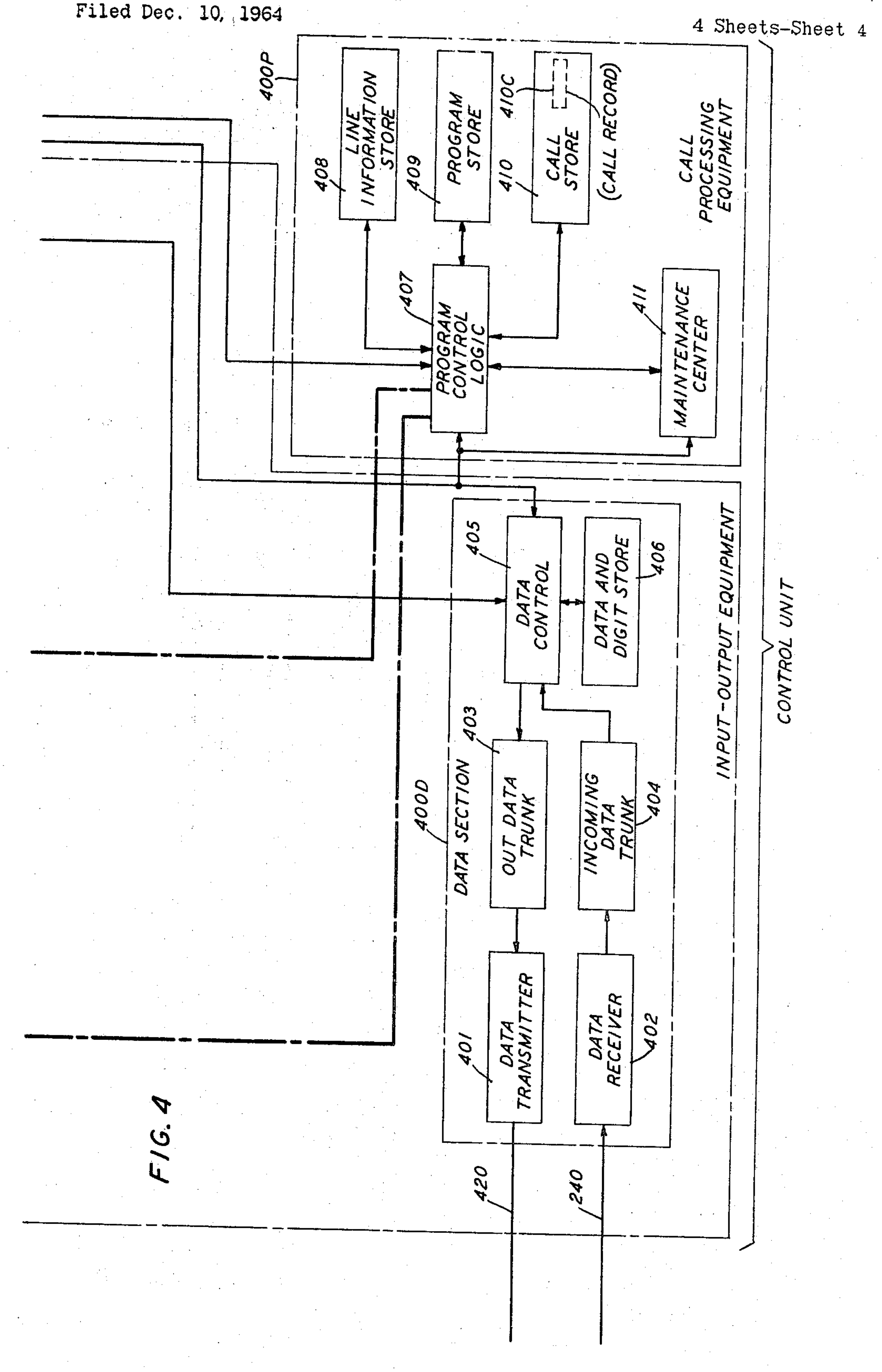

Changes in the supervisory states of lines, trunks, and attendant console keys are detected by local scanner 201 and transmitted over data link 240 to the input-output equipment 400D of the control unit in FIG. 4. Signals to the switch unit from the control unit are transmitted over data link 420 and are in the form of data messages which set up or take down network connections or which operate signal lamps at the attendant console 104 (FIG. 1).

Figure 3:
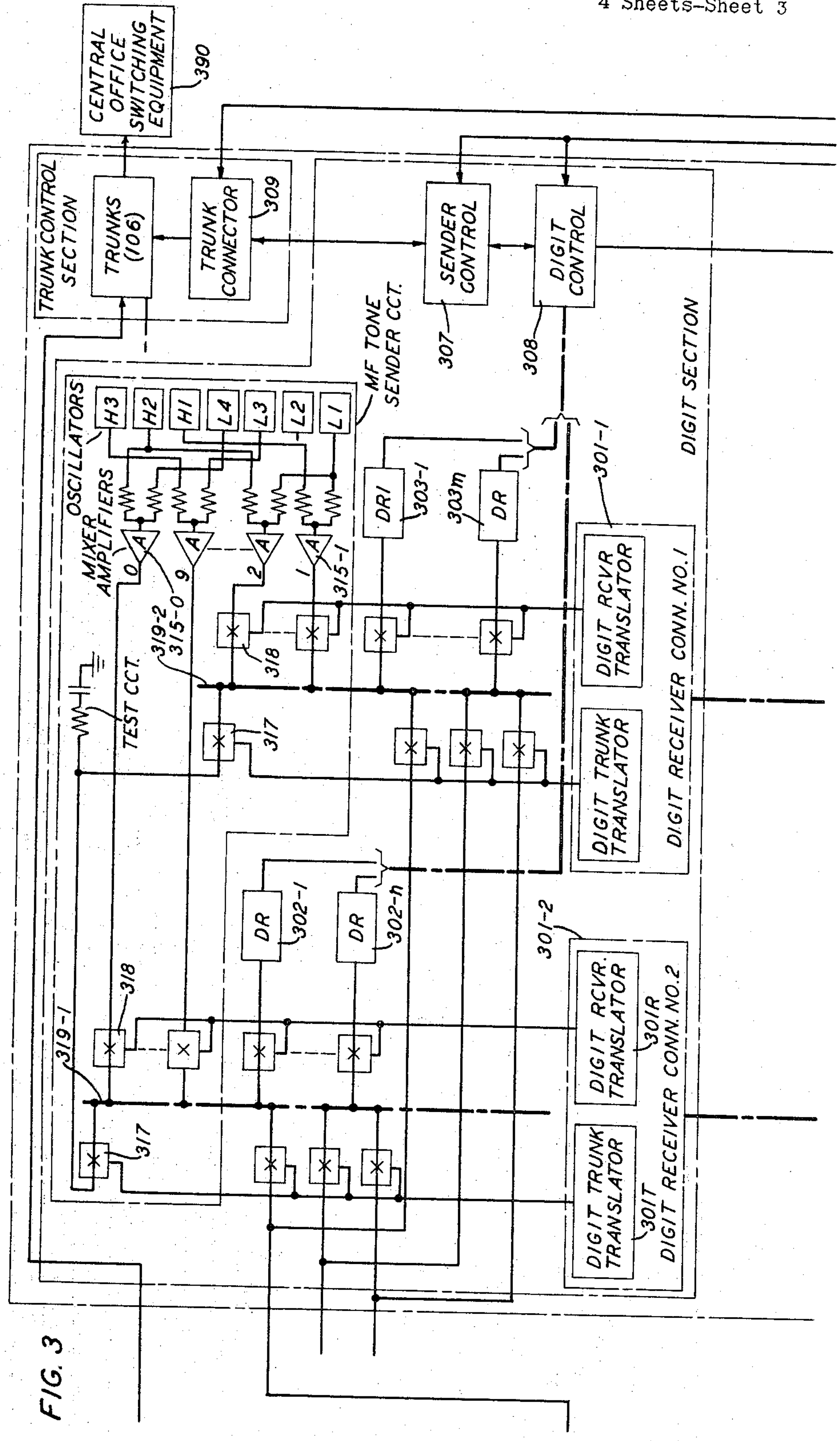
FIGS. 3 and 4 show the control unit and central office of this specific illustrative embodiment.

The control unit is guided by instructions stored in program store 409 (FIG. 4). When a station such as station 102 initiates a call, the off-hook state is detected by scanner 201 which passes the calling station's equipment number and the off-hook condition to data transmitter 207. Data transmitter 207 sends this message to data receiver 402 at the control unit (FIG. 4). Under the direction of data control 405 the information is transferred from data receiver 402 to data and digit store 406 until called for by the call processor 400P. The call processor then, by means of its program control logic 407, selects an idle digit trunk 107 and digit receiver 302–1, *n*; 303–1, *m*. The call processor also selects time slots in switch store 202–1, 2 (FIG. 2) and in the digit receiver connector 301–1, 2 (FIG. 3). The number of the selected digit trunk, the calling station's equipment number, the time slot number, and the scanner start signal are passed to data and digit store 406 for transmission to the switch unit by data transmitter 401. At the switch unit, data receiver 208 passes the incoming message to data distributor 209 which writes the calling station's equipment number and the digit trunk number into the proper time slot in the switch store 202–1, 2 thus connecting the calling station to the digit trunk 107 priorly selected by the operation of the call processor. The call processor 400P writes the number of the selected digit trunk 107 of the digit receiver 302–1, *n*; 303–1, *m* into the chosen time slot of the digit receiver connector 301–1, 2 thereby connecting the selected digit trunk 107 to the selected digit receiver. Dial tone is returned by the digit receiver over the digit trunk to the calling station.

When a calling station such as station 101 dials the digit "9" to signify an outgoing central office call, the digit is received by the assigned digit receiver and passed to the call processor. In the call processor, line information store 408 is interrogated for dialing restrictions, and assuming that station 101 is unrestricted, call processor 400P selects and seizes an idle central office trunk such as trunk 106. The seizure of trunk 106 results in the switching equipment of central office 390 returning a "register attached" signal in the conventional manner to trunk 106. The call processor responds to this signal and orders the digit receiver to return second dial tone to station 101 over digit trunk 107. Thereafter, the digits dialed at station 101 are entered in the digit receiver and placed in data and digit store 406. At this point line information store 408 is again interrogated to compare the first three digits with a list of allowed codes.

Assuming that the call is allowed, sender control 307 outpulses the dialed digits. After outpulsing to the central office is completed, call processor 400P sets up a transmission connection in FIG. 1 from calling station 101 to central office trunk 106 and the station user hears ringback or busy tone from the central office 390.

If a calling station is accorded compressed dialing (or keying privileges, the initial directing digit "9" is dispensed with. Instead, the three-digit compressed code dialed after the calling station receives dial tone is entered in the assigned one of digit receivers 301–1, *n*; 303–1, *m* the outputs of which are sampled three at a time by digit control 308. Under the direction of digit control 308 the compressed code digits are placed in that portion of data and digit store 406 associated with the selected one of the aforementioned digit receivers. In the call processor, line information store 408 is interrogated, and assuming station 101 is allowed compressed dialing privileges, an idle central office trunk such as 106 is seized by trunk connector 309. When the "register attached" signal is returned by central office switching equipment 390, the compressed code information registered in the call processor is employed in combination with the switch unit number to address a specific location in line information store 408 to obtain the expanded counterpart of the compressed code.

In accordance with the prior compressed dialing procedures, the expanded counterpart, i.e., conventional directory number of the call telephone, is transmitted to sender control 307 which places the digits in data and digit store 406. Outpulsing of the digits from the data and digit store is under direction of the sender control. Outpulsing is in the form of size and release pulses transmitted from trunk connector 309 to gates (not shown) in trunk circuit 106 which operate work relays therein to open and close the trunk loop to central office switching equipment 390. As before, after outpulsing to the central office is completed, the call processor sets up the transmission connection from the calling station to the central office trunk.

In both the aforementioned cases, i.e., the ordinary outgoing or dial "9" call and in the prior compressed code outgoing call, outpulsing by the sender control unit is in the form of size and release pulses transmitted to the trunk connector. There is no actual transmission path from the data and digit store 406 to the trunk. This trunk circuit operation is further disclosed in P. C. Richards application Serial No. 413,900 filed November 25, 1964.

In accordance with the present invention, however, a new path is set up for the transmission of digits through trunk 106. When the compressed code is initially registered in one of the digit receivers, for example, digit receiver 302–1, it is transferred to the data and digit store 406 in the usual manner and transferred therefrom to the call processor 400P. Program store 409 instructs program control logic 407 to transmit a signal to trunk connector 309 indicating that a particular idle central office trunk is to be seized. After the seizure of a central office trunk such as trunk 106, for example, the central office switching equipment 390 returns a "register attached" signal over the trunk.

Program store 409 contains a bit which indicates that the control unit is equipped for multifrequency tone outpulsing of compressed code numbers. Accordingly, when the "register attached" signal is received by trunk 106, program store 409 instructs program control logic 407 to utilize data control 405, out data trunk 403, and data transmitted 401 to send the remote switch unit the equipmen location in the switch unit of the central office trunk over which the "register attached" signal was returned and also the equipment location of the digit trunk over which the compressed code was initially entered in digit receiver 302–1. The equipment location of the central office trunk is received by A translator 203A–1 and the equipment location of the digit trunk is received by B translator 203B–1 through the operation of switch store 202–1, data distributor 209, and data receiver 208. A translator 203A–1 controls the one of sampling switches 111 individual to central office trunk 106 to connect the trunk to transmission bus 113–1. B translator 203B–1 similarly controls the one of sampling switches 111 individual to digit trunk 107 on transmission bus 113–1 so that a connection is established between trunk 106 and trunk 107 at the remote switch unit.

Upon the receipt of the "register attached" signal, an idle call record 410C is reserved in call store 410 and the number of digit receiver time slot in data and digit store 406 is transferred to the call record. Program store 409 controls program logic 407 to obtain from line information store 408 the expanded counterpart of the compressed code and to enter this information into data and digit store 406. The first four digits of the expanded code stored in data and digit store 406 are then transferred into the aforementioned call record in call store 410.

Call store 410 contains information indicating the busy or idle state of each of the ten multifrequency tone sources in the same manner as it contains records of the connection state of sampling switches 317, 318 on each of the common buses 319–1, 2. The multifrequency tone sender circuit for generating the ten unique pairs of multifrequency tones comprises seven oscillators each producing a single one of the required frequencies. These frequencies are in two sets, low and high, as is known in the art and are identified as oscillators L1, L2, L3, L4, H1, H2, and H3. There are ten mixer amplifiers 315–1 through 315–0, one for each digit, and these amplifiers can be considered as a unique and individual tone sources for the ten sets of tones. The mixer amplifier for a particular digit combines the outputs of the two oscillators for that digit, amplifies the pair of frequencies, and connects them through sampling switch 318 to the bus 319 of the digit receiver connector.

The call store information indicating the busy or idle state of each of the tone sources is utilized in establishing the connections between digit trunks and digit receivers, program control logic 407 transmitting to the digit receiver connector 301–1, 2, code signals translated by the digit trunk translator 301T to connect the appropriate digit trunk 107 through a switch 317 to common bus 319, and the digit receiver translator 301R functioning to operate one of sampling switches 318 to connect the appropriate digit receiver, such as receiver 302–1, to the same common bus.

Instead of transmitting signals for selecting the sampling switch 318 associated with digit receivers, program control logic 407 transmits to digit receiver connector 301–1, 2 signals for selecting the one of sampling switches 318 associated with the particular one of multifrequency tone sources 315–1, 0 appropriate to the digit of the expanded code to be transmitted. Accordingly, one of sources 315–1, 0 is connected by common bus 319–1, 2 to digit trunk 107 which conveys the tone signal to the remote switch unit. At the remote switch unit the connection established between digit trunk 107 and central office trunk 106 provides a path through which the tones may be extended outward to the central office switching equipment 390.

During the outpulsing of a call, the call record used to connect the tone sources to the digit trunks reads the data and digit store to obtain the digits (by groups of four) to be outpulsed. The data and digit store can be read by using numbers that appear to the store to be digit receiver numbers, since each of the ten tone sources corresponds to a time slot and like a digit receiver is activated by the receiver translator of the digit receiver connector. If twenty-five time slots are available in each of the two digit receiver connectors, for a total of fifty, and forty digit receivers are employed, then the remaining time slots can be utilized for the ten tone sources. The tone sources can thus be given digit receiver numbers and considered by the control unit exactly as if they were, in fact, digit receivers.

In the call record the digits of the expanded code are stored in binary form. The decimal digit zero is advantageously not represented by the binary code 0000 so that this all-zero code can be used to indicate the end of outpulsing. To outpulse a digit, a tone corresponding to the digit is connected to the digit trunk for one scan of the call store (64 microseconds) and the connection is broken on the succeeding scan. When a tone is to be connected a status bit corresponding to the tone source is checked before the connection is made. If the bit indicates that the tone is busy (bit=1), an attempt to obtain the tone is made on successive scans. If the tone is idle (bit=0), the bit is set to 1 to prevent possible double connections due to simultaneous calls, and the connection is made to the tone source at the digit receiver connector. On the following scan the connection is broken and the status bit set =0 freeing the source for use in other calls.

The outpulsing call record determines that sending is completed by examining each digit before sending it to determine if it is all-zero. When this occurs, an indication is placed in the data and digit store, as determined by the digit receiver number, and the call record used for outpulsing is made idle for use of other calls.

During outpulsing, the call record, containing the calling party identity and the called trunk and digit receiver numbers, examines the digit receiver once each scan to determine if sending has been completed. After the outpulsing call record writes the sending complete indication into the digit receiver, the indication is passed to the call processing record by the digit control circuitry. The call proceeds in the normal manner from this point.

Accordingly, in embodiments of our invention by utilizing time division techniques together with multifrequency tone signals exceedingly rapid compressed dialing is obtained. Further, by connecting the tone sources through sampling gates in the same manner as the digit receivers, the logical operations of the control unit in scanning for the tone connections is greatly simplified.

It is to be understood that the above-described arrangements are illustrative of the principles of the invention. Numerous other arrangements may be devised by those skilled in the art without departing from the spirit and scope of the invention.

What is claimed is:

1. In a time division telephone switching system having remote switching units each including a bus for establishing time division connections among lines and trunks and a control unit including a time division bus for connecting digit receivers with digit trunks incoming from said remote switch units, the improvement comprising a plurality of multifrequency digit tone sources connected to said control unit time division bus and means for controlling said time division bus at said remote switch unit and at said control unit serially to connect said multifrequency tone sources with one of said digit trunks at said control unit and with one of said first-mentioned trunks at said remote switch.

2. In a telephone switching system, a central call processor for controlling the establishment of time division communication connections between lines and trunks at a plurality of remote switch units and including a plurality of centrally-located digit receivers, means including a digit trunk for connecting said digit receivers to each of said remote switch units on a time division basis, a plurality of centrally-located, digit-representative tone sources, and means in said call processer for controlling the time division connection of said tone sources to said digit trunks to transmit digit sequences to said remote switch units.

3. A telephone switching system having a central call processor for controlling the establishment of time division communication connections between lines and trunks at a plurality of remote switch units and including a plurality of centrally-located digit receivers, said digit receivers being connectable over digit trunks respective to each of said remote switch units on a time division basis to receive condensed called number codes, said system comprising means for translating said condensed codes into expanded core counterparts, means for temporarily storing said expanded code counterparts, a plurality of digit tone sources, and means controlled by said temporarily storing means for selectively connecting said digit tone sources to said digit trunks in accordance with said expanded code counterparts stored therein.

4. A telephone switching system according to claim 3 wherein said call processor controls said switch units to establish time division connections between said communications trunks and said digit trunks and simultaneously therewith controls said selectively connecting means to establish time division connections between said plurality of tone sources and said digit trunks.

5. A telephone switching system having a centrally-located control unit and a plurality of stations and central office trunks at each of a plurality of remotely located switch units, a digit trunk individual to each of said switch units, said control unit including a time division bus and a plurality of digit receivers, said digit trunks and said digit receivers appearing in said time division bus, means for controlling said time division bus to connect said digit trunks with said digit receivers to receive called-number codes from said switch units, the improvement comprising a plurality of multifrequency digit signal sources appearing in said time division bus, and means for controlling said time division bus selectively to connect said signal sources to said digit trunk to transmit multifrequency signal codes over said digit trunks to said switch units.

6. A telephone switching system including a control unit having a stored program controlled call processor for establishing time division connections among lines and communications trunks at a plurality of remote switch units and including digit trunks individual to said switch units for providing called number information to said call processor on a time division basis, said system control unit comprising means for translating said called number information into expanded code counterparts thereof, means for storing said expanded code counterparts, a plurality of digit tone sources connectable to said digit trunks, periodically scanned call store means for maintaining a record of the connection states of said digit tone sources, call record means in said call store for receiving said expanded code counterparts from said storing means, and control logic means periodically activated by said call store means for connecting idle ones of said digit tone sources to said digit trunks in accordance with said expanded code counterparts in said call record means.

7. A telephone switching system according to claim 6 wherein said control unit includes means for seizing idle ones of said communications trunks and means for controlling connections between said digit trunks and said seized ones of said communications trunks at said remote switch units.

8. In a telephone system comprising a central office, a remote switch unit, a control unit, a plurality of digit trunks interconnecting said switch unit and said control unit, a plurality of central office trunks interconnecting said switch unit and said central office and means for defining a plurality of time slots in a recurrent cycle, said control unit comprising means for receiving digit pulses form a calling line terminating on said switch unit identifying a called line reached through said central office, a plurality of tone sources and means operative in response to receipt of said digit pulses for activating one of said digit trunks and one of said central office trunks in a first time slot and for connecting a distinct one of said tone sources corresponding to one of said digit pulses to said activated digit trunk during each successive appearance of said first time slot.

9. In a time division switching system, a remote switch unit, a control unit, a plurality of digit trunks interconnecting said switch unit and said control unit, a plurality of central office trunks extending from said switch unit, said control unit including a plurality of digit receivers for receiving digit pulses identifying a called line reached through said central office trunks, a common bus, means for connecting said digit trunks to said common bus, a plurality of tone sources, switching means connecting said receivers and said tone sources to said common bus, and means for controlling the time division connection of said tone sources to said common bus to transmit digit sequences over one of said digit trunks to said switch unit, said controlling means including common means for connecting said digit receivers and said tone sources to said common bus.

10. In a telephone system having a control unit and remote switching unit, a plurality of digit trunks interconnecting said control and switching units, a common bus, a plurality of digit receivers, a plurality of tone sources, first switch means connecting said digit trunks to said bus, second switch means connecting said digit receivers to said bus, third switch means connecting said tone sources to said bus, and means for enabling said first and second switch means for interconnecting said trunks and receivers during first intervals of a recurrent time cycle to receive from said switch unit compressed dial information and for subsequently enabling said first and third switch means during subsequent intervals of said time cycle to transmit to said switching unit complete dial information.

References Cited

UNITED STATES PATENTS

| | | | |
|---|---|---|---|
| 3,105,878 | 10/1963 | Frankel et al. | 179—18.9 |
| 3,268,669 | 8/1966 | Vigliante et al. | 179—18 |

KATHLEEN H. CLAFFY, *Primary Examiner.*

L. A. WRIGHT, *Assistant Examiner.*